Figure 1:
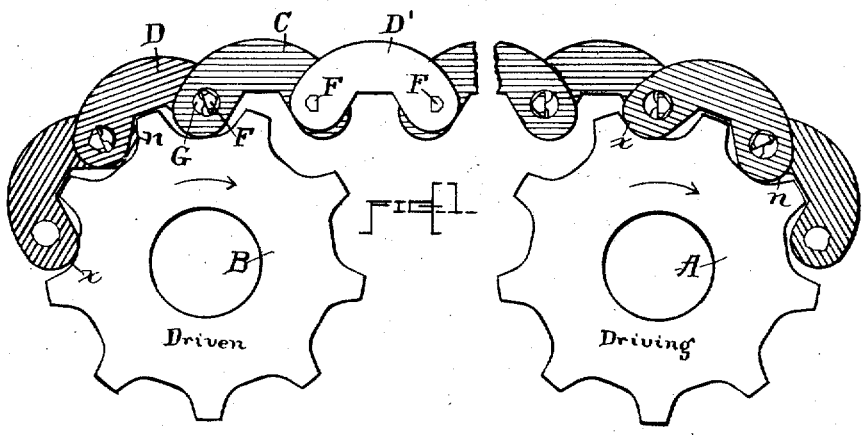

No. 12,844. REISSUED AUG. 18, 1908.

E. F. MORSE.

DRIVE CHAIN.

APPLICATION FILED JUNE 30, 1908.

4 SHEETS—SHEET 1.

Witnesses:

Harry L. Lechner

Archibald Mairis

Inventor:

E. F. Morse by atty Paul Synnestvedt

No. 12,844. REISSUED AUG. 18, 1908.

E. F. MORSE.

DRIVE CHAIN.

APPLICATION FILED JUNE 30, 1908.

4 SHEETS—SHEET 2.

Witnesses:
Harry L. Lechner
Archworth Martin

Inventor:
E. F. Morse
by atty
Paul Synnestvedt

No. 12,844. REISSUED AUG. 18, 1908.

E. F. MORSE.

DRIVE CHAIN.

APPLICATION FILED JUNE 30, 1908.

4 SHEETS—SHEET 3.

Witnesses:
Harry L. Lechner
Richmond Martin

Inventor:
E. F. Morse
by atty Paul Synnestvedt

No. 12,844. REISSUED AUG. 18, 1908.

E. F. MORSE.

DRIVE CHAIN.

APPLICATION FILED JUNE 30, 1908.

4 SHEETS—SHEET 4.

Witnesses:
Harry L. Lechner
Archworth Martin

Inventor:
E. F. Morse
by atty
Paul Synnestvedt

UNITED STATES PATENT OFFICE.

EVERETT F. MORSE, OF TRUMANSBURG, NEW YORK, ASSIGNOR TO MORSE CHAIN COMPANY, OF TRUMANSBURG, NEW YORK.

DRIVE-CHAIN.

No. 12,844. Specification of Reissued Letters Patent. Reissued Aug. 18, 1908.

Original No. 757,762, dated April 19, 1904, Serial No. 76,616. Application for reissue filed June 30, 1908. Serial No. 441,265.

*To all whom it may concern:*

Be it known that I, EVERETT F. MORSE, a citizen of the United States, and a resident of Trumansburg, in the county of Tompkins and State of New York, have invented certain new and useful Improvements in Drive-Chains, of which the following is a specification.

This invention relates to an improvement in drive-chains for general power transmission, and particularly to chains of this class wherein the pintle consists of two parts bearing upon one another throughout their length along the line of bearing of the link upon the other in the joint.

One object of the invention is to increase the bearing-surface at the joint in chains wherein the links are made up of plates of which those in one link are interspersed upon the pintle with those of the adjacent links and wherein each of the plates of one link engages its respective part of the pintle and turns therewith freely on the other part of the pintle.

Another object is the construction of the chain in a manner such that alternate links only of the chain shall engage the sprocket whereby the parts of the pintles having plain bearing surfaces—the seat pins—may be mounted facing each other in those links which do not touch the sprocket and which bearing surfaces are substantially at right angles to the length of the links, any slipping tendency of the rockers—the other members of the two-part pintle—upon the seat-pins being thereby avoided.

Another object of the invention is the formation of the seat-pin with flattened or otherwise irregular sides throughout, whereby it will hold a fixed position in each of the plates with which it engages, the holes in the links sustaining the seat-pin being made to substantially conform to said irregularities.

With these objects in view the invention consists in the construction and combination of parts, substantially as hereinafter set forth and claimed.

Figure 2:
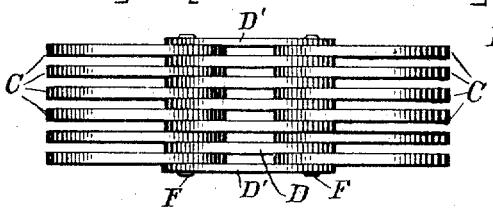
Figure 3:
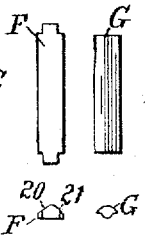
Figure 5:
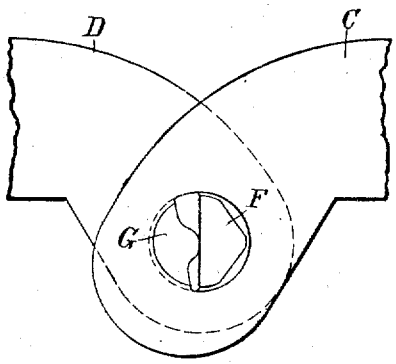
Figure 4:
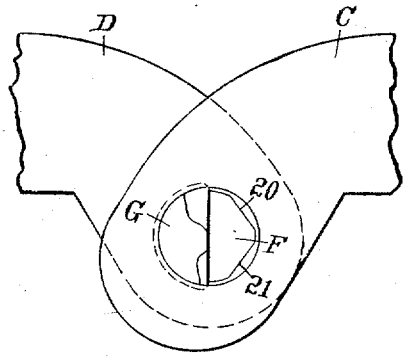
Figure 7:
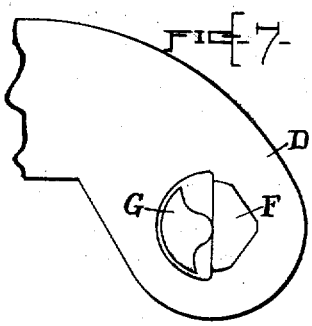
Figure 6:
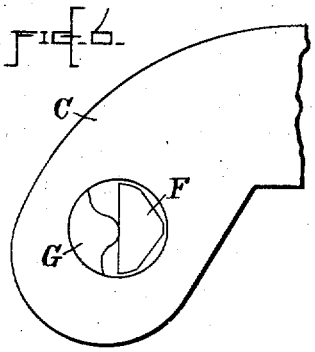
Figure 9:
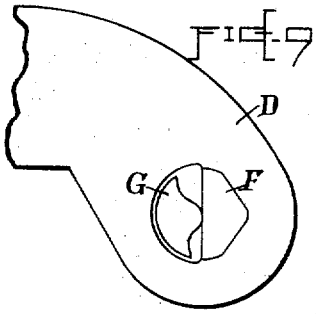
Figure 8:
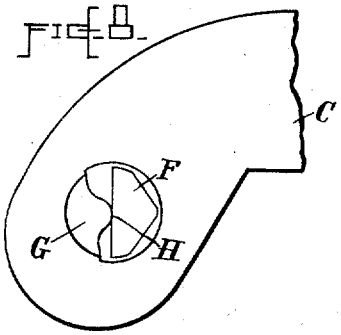
Figure 10:
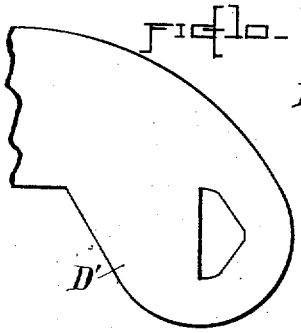
Figure 11:
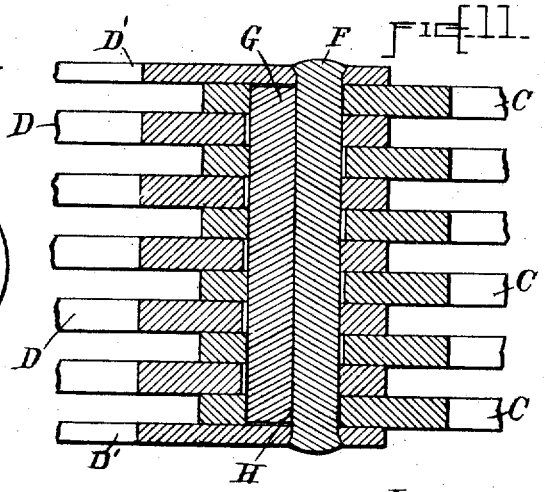
Figure 12:
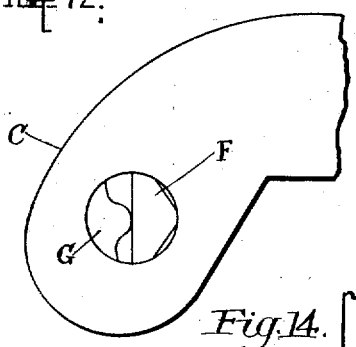
Figure 13:
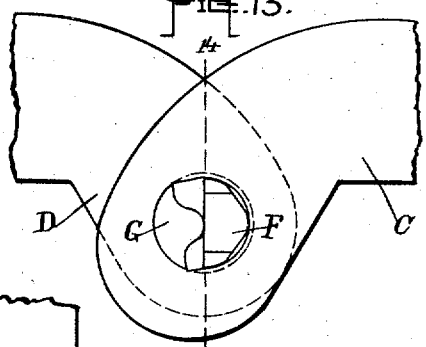
Figure 14:
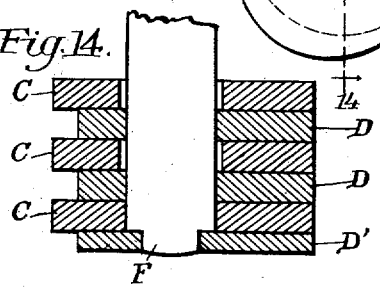
Figure 15:
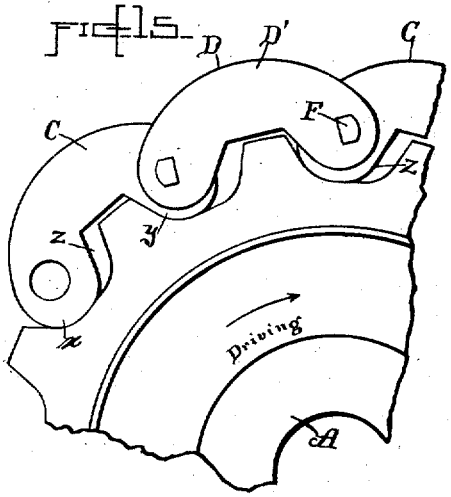
Figure 16:
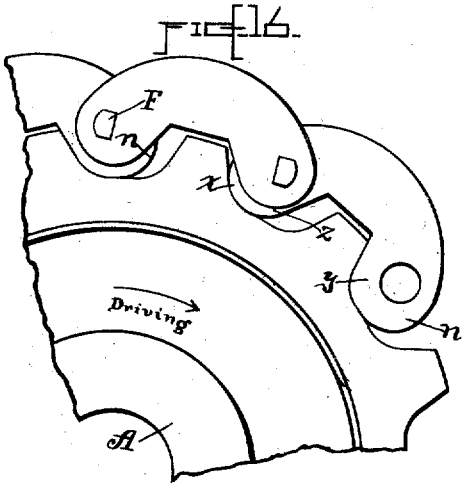
Figure 17:
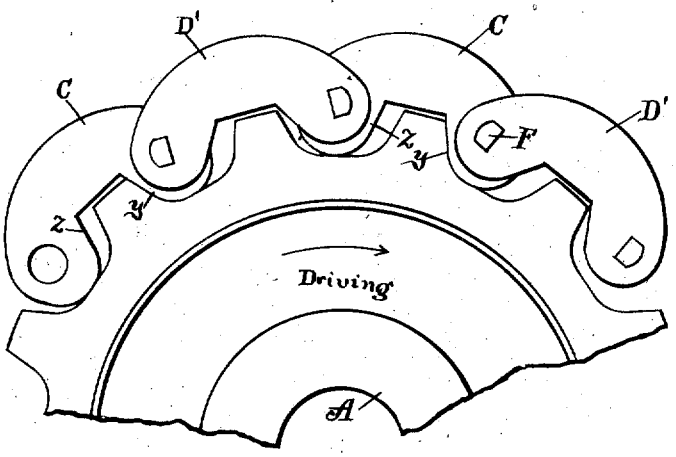
Figure 18:
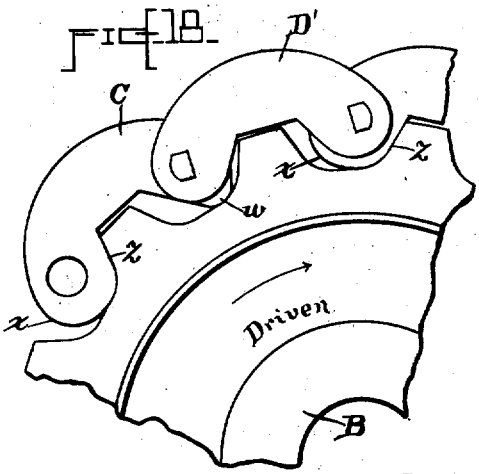
Figure 19:
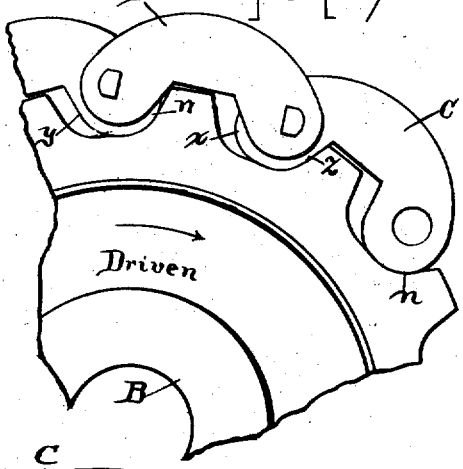
Figure 20:
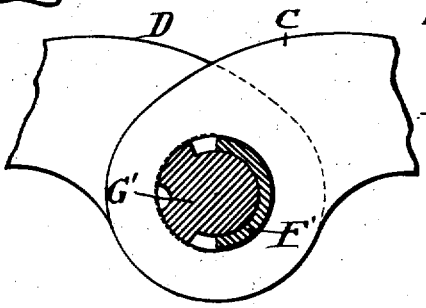

In the accompanying drawings, which form a part of this specification, Figure 1 represents in side elevation a pair of sprocket-wheels and a section of chain, parts of the latter being broken away to disclose the mechanism of the joints. Figure 2 is a plan of three consecutive links in the chain seen in Figure 1. Figure 3 represents in side and end elevations the parts of a pintle in said chain. Figure 4 represents in end view the parts forming a joint of my chain, wherein the pintle consists of a seat-pin and a rocker and wherein the radius of curvature of the rocker is somewhat larger than that of the seat-pin and wherein the apertures through the links are made to conform to this relation of the two parts of the pintle. Figure 5 is a similar view of forms of apertures in the adjoining links when the seat-pin and rocker have the same radius of curvature. Figures 6 and 7 show the forms of apertures in overlapping ends of plates forming the links represented as joined in Figure 4. Figures 8 and 9 give a similar representation with respect to Figure 5. Figure 10 represents one end of one of the outside plates of a link, showing the form of aperture for receiving the end of the seat-pin, which serves to connect together the plates constituting adjacent links. Figure 11 represents a horizontal section through the joint shown in Figure 5. Figure 12 shows the aperture in the outside plate of the links supporting the rocker, wherein the radius of curvature of the rocker and seat-pin is the same. Figure 13 is a similar view of the joint, wherein the radius of curvature of the rocker is larger than that of the seat-pin. Figure 14 is a vertical section through the joint seen in Figure 13, taken in the plane indicated by the line 14—14, and shows the difference in the size of the apertures in the outside plates of the link engaging the rocker and intermediate links. Figure 15 represents in elevation a section of sprocket wheel and chain, wherein the engaging links of the chain are designed to have internal engagement on either end and external engagement on one end. Figure 16 is a like view wherein the engaging links are designed to have external engagement on either end and internal engagement on one end. Figure 17 is a like view wherein the engaging links are designed to have internal engagement on either end. Figure 18 is a like view wherein the engaging links have internal and external engagement on one end and no engagement on the other except to touch the sprocket-wheel between the faces of the teeth. Figure 19 is a like view wherein the engaging links have either internal or external engagement on both ends. Figure 20 is a transverse section of the joint, showing a modified form of pintle.

This invention has to deal especially with chains wherein the links are made up of a series of plates whereof the plates of each link are interspersed upon the pintle, preferably in regular alternation with those of the adjacent links, and wherein the pintle or pivot joining the links consists of two members, each rocking upon the other along the axis of oscillation between adjacent links.

In Figure 1, A and B indicate a pair of sprocket-wheels; C, the plates constituting the links which engage the sprockets; D, the inside plates, and D′ the outside plates, constituting the links which do not engage the sprockets. The pintle consists of two parts; F, the seat-pin, and G, the rocker. The seat-pins are fixed in the ends of the plates D′, so that their plain bearing surfaces face one another and are substantially perpendicular to the length of the link. The seat-pins F are also provided with irregular generally flattened rear surfaces throughout their length, as indicated at 20, 21, Figures 3 and 4, whereby the plates D will be held in fixed relation to the seat-pins, the apertures in said plates being made to conform to said surfaces of the seat-pin, as indicated in Figures 4, 5, 7 and 9. The seat-pins are also preferably shouldered, as indicated in Figures 3 and 14, and in assembling the chain the reduced ends are slightly softened in order that they may be riveted upon the outside plates D′, as clearly seen in Figure 11.

The rocker G has the back surface, or that which engages the aperture of the links C, preferably cylindrical, though, if preferred, it, too, may be fixed in place in said plates by making its back surface irregular, as in the seat-pin.

In constructing a chain of the sort just described, ample clearance should be provided in the plates of one link for the movement of that part of the pintle which is secured in or has intimate engagement with the ends of the plates of the adjacent links. This clearance is fully illustrated in Figures 4 to 14. It is also advisable to make the clearance portion of the pintle-aperture in the plates along the middle of the pintle a little larger than at the ends of the pintle, so as to provide against the possibility of the parts of the pintle binding in said apertures should either part of the pintle fail to be perfectly straight. This variation in size of apertures is seen in Figures 11 and 14, wherein the apertures in the outermost plates C provide simply for the free movement of the said plate about the seat-pin F, while in the intermediate plates C and in the plates D ample clearance for all purposes is provided.

One of the chief advantages of the two-part pintle in a plate-chain resides in the fact that a continuous bearing is provided throughout the width of the links, as clearly illustrated in Figure 11. Were the pintle a solid one, the links D would have a bearing in the joint for but one-half the length of the pintle and likewise with the links C, whereas with a two-part pintle each of said links has a bearing extending from one outside plate D′ to the other along the line H, Figures 8 and 11. Thus for each link the bearing surface is doubled by the use of the two part pintle, and the wearing away at the pintle is thereby very materially decreased. This feature of my invention is equally applicable to a joint, as shown in Figure 20, formed of pintles designed so that one part of the pintle G′ rubs on or turns in the other part F′ as the joint bends. This formation of chain wherein alternate links only engage the sprockets enables the mode of engagement between the sprocket-engaging links and the sprocket to be considerably varied, as illustrated in Figures 15 to 19.

In Figure 15 the chain running over the driving sprocket-wheel A, for example, engages the sprocket teeth by the external and internal bearing surfaces $x$ and $y$ of the links C, while in running over the driven sprocket-wheel the teeth are engaged solely by the internal bearing-surfaces $z$ of the links C, as is clearly seen by conceiving the direction of movement of the wheel A to be reversed.

In Figure 16 the same is true with respect to the driving sprocket-wheel, but on the driven sprocket the link C engages the sprocket teeth solely by the external bearing surfaces $n$.

In Figure 17 the engagement with the teeth of the driving sprocket-wheel is by the internal bearing-surfaces $y$ of the links C, and on the driven sprocket the engagement would be by the internal bearing surfaces $z$, while in Figure 1 the same is true with respect to the external bearing-surfaces $x$ and $n$, respectively, of the links C.

In Figure 18, the engagement on the driven sprocket is by the internal bearing surfaces $z$ and on the driving sprocket by the external bearing surfaces $x$, the opposite ends of links C not touching the sprocket teeth at all, but simply resting by a projection W upon the sprocket wheel between the teeth.

In Figure 19 the engagement with the teeth of the driven sprocket wheel is by the internal and external bearing surfaces $z$ and $n$, respectively, of the links C, while the engagement with the teeth of the driving sprocket-wheel is by the external and internal bearing surfaces $x$ and $y$, respectively, of the links C.

While the explanation of the invention above given has reference specifically to a structure in which the pintle is described as composed of "two" parts, it is obvious that the generic idea involved is applicable to a structure having a pintle made in "separate"

parts, whether there be two or any other number of parts more than one. A three-part pintle chain of analogous structure is shown in one of the modifications of the applicant's Patent No. 736,999 which was co-pending with the original Letters Patent 757,762. I do not in this patent cover *per se* a pintle made in two parts, or in separate parts (whether two or more) irrespective of the form of links with which the pintle is associated. On the contrary, all the claims of this patent in which the pintles are elements are limited to the employment of such pintles in what are commonly known as multi-plate chains or links, whereby the effective bearing surface is increased.

I claim as my invention—

1. A drive-chain having its links composed of a plurality of plates, the plates of each link being interspersed upon the pintles with the plates of the adjacent links, and pintles formed in separate parts, of which one part engages with the plates of one link only and bears upon the other part of the pintle.

2. A drive-chain having each link composed of a plurality of plates, the plates of each link being interspersed upon the pintles with the plates of the adjacent links, and pintles formed in separate parts adapted to turn one upon the other, the apertures in said plates through which both parts of the pintles pass being made to hold in place one part of each pintle, and to allow free movement or clearance of the other part thereof.

3. A drive-chain having each link composed of a plurality of plates, the plates of each link being interspersed upon the pintles with the plates of the adjacent links, and pintles formed in separate parts adapted to turn one upon the other, the apertures in said plates through which both parts of the pintles pass being made to hold in place one part of each pintle and to allow free movement or clearance of the other part thereof, and which apertures in the intermediate plates have a larger clearance portion than in the outermost ones.

4. A drive-chain having each link composed of a plurality of plates, the plates of each link being interspersed upon the pintles with the plates of the adjacent links, and pintles formed in two parts engaging each other along the axis of oscillation of the links and adapted to rock one upon the other.

5. A drive chain having each link composed of a plurality of plates, the plates of each link being interspersed upon the pintles with the plates of the adjacent links, and alternate links being free from engagement with the sprockets, and two-part pintles of which the seat pins are mounted facing each other in the links which do not engage the sprockets and have plain bearing surfaces which are substantially at right angles to the length of said links.

6. A drive-chain having each link composed of a plurality of plates, the plates of each link being interspersed upon the pintles with the plates of the adjacent links, and two-part pintles of which the seat-pins have flattened sides throughout their length whereby they hold a fixed position in each of the plates with which they engage.

7. A drive-chain having each link composed of a plurality of plates, the plates of each link being interspersed upon the pintles with the plates of the adjacent links, and two-part pintles of which the seat-pins have irregular rear surfaces whereby they hold a fixed position in each of the plates with which they engage.

8. A drive-chain having links adapted to arch over the sprockets, the alternate links being free from engagement with the sprockets, and the remaining links constructed to have external engagement by one end in running over one sprocket and external engagement by the other end in running over the other sprocket.

9. A drive-chain having adjacent links composed of a plurality of plates adapted to arch over the sprocket-teeth, the plates of each link being interspersed upon the pintles with the plates of the adjacent links, and pintles formed in two parts, of which one part engages with the plates of one link only and passes freely through openings in the plates of the adjacent link, and the other part engages with the plates of said adjacent link and passes freely through openings in the plates of the first-mentioned link.

10. A drive-chain having adjacent links composed of a plurality of plates adapted to arch over the sprocket-teeth, the plates of each link being interspersed upon the pintles with the plates of the adjacent links, and pintles formed in separate parts which bear upon each other throughout substantially the full width of the chain, one part of the pintle engaging with the plates of one link only and passing freely through openings in the plates of the adjacent link.

11. A drive-chain having each link composed of a plurality of plates interspersed upon the pintles with the plates of the adjacent links, and pintles formed in separate parts extending substantially the full width of the chain, and adapted to turn one upon another, the apertures in said plates being made to rigidly hold one part of each pintle and to allow free movement of the other part thereof.

12. A drive chain having adjacent links composed of a plurality of plates adapted to arch over the sprocket teeth, the plates of each link being provided with apertures at their ends and interspersed upon the pintles with the plates of the adjacent links, and pintles formed in a plurality of separate parts adapted to engage one with another to form a longitudinally extended bearing throughout substantially the full width of the chain, one of the parts of the pintle being so engaged in the apertures of the plates of one link only as to turn therewith and passing freely through the apertures in the plates of the adjacent link, and another of the parts of the pintle being so engaged in the apertures of the plates of such adjacent link as to turn therewith, and passing freely through the apertures in the plates of the other link.

In testimony whereof I have hereunto signed my name in the presence of the subscribed witnesses.

EVERETT F. MORSE.

Witnesses:

C. W. FLETCHER,

L. D. HAYES.